(12) United States Patent
Izawa et al.

(10) Patent No.: US 8,165,749 B2
(45) Date of Patent: Apr. 24, 2012

(54) CONTROL SYSTEM FOR ADJUSTABLE DAMPING FORCE DAMPER

(75) Inventors: Masaki Izawa, Saitama (JP); Takafumi Kato, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 574 days.

(21) Appl. No.: 11/391,309

(22) Filed: Mar. 29, 2006

(65) Prior Publication Data

US 2006/0224287 A1    Oct. 5, 2006

(30) Foreign Application Priority Data

Mar. 31, 2005 (JP) ................. P.2005-101580
Dec. 7, 2005 (JP) ................. P.2005-352952

(51) Int. Cl.
*B60G 17/00* (2006.01)

(52) U.S. Cl. ............. 701/37; 701/29; 701/36; 701/38; 701/39; 701/48; 280/5.5; 280/5.502; 280/5.504; 280/5.506; 280/5.507; 280/5.512; 267/2

(58) Field of Classification Search ............ 73/117.01, 73/117.03
See application file for complete search history.

(56) References Cited

U.S. PATENT DOCUMENTS

| | | | | |
|---|---|---|---|---|
| 4,761,022 A * | 8/1988 | Ohashi et al. | ............. | 280/5.504 |
| 5,396,423 A * | 3/1995 | Fujimura et al. | ............. | 701/38 |
| 5,627,751 A * | 5/1997 | Davis et al. | ............. | 701/29 |
| 5,669,677 A * | 9/1997 | Fischer | ............. | 303/147 |
| 5,782,543 A * | 7/1998 | Monzaki et al. | ............. | 303/146 |
| 5,809,434 A * | 9/1998 | Ashrafi et al. | ............. | 701/1 |
| 5,948,027 A * | 9/1999 | Oliver et al. | ............. | 701/37 |
| 6,208,920 B1 * | 3/2001 | Izawa et al. | ............. | 701/36 |
| 6,233,513 B1 * | 5/2001 | Furukawa et al. | ............. | 701/74 |
| 6,366,841 B1 * | 4/2002 | Ohsaku | ............. | 701/37 |
| 6,405,109 B1 * | 6/2002 | Kyrtsos et al. | ............. | 701/29 |
| 6,895,318 B1 * | 5/2005 | Barton et al. | ............. | 701/42 |
| 2003/0212476 A1 * | 11/2003 | Aanen et al. | ............. | 701/1 |
| 2004/0060765 A1 * | 4/2004 | Mattson et al. | ............. | 180/422 |
| 2005/0067213 A1 * | 3/2005 | Yasui et al. | ............. | 180/443 |
| 2005/0113997 A1 * | 5/2005 | Kim | ............. | 701/37 |
| 2005/0234628 A1 * | 10/2005 | Luders et al. | ............. | 701/80 |
| 2006/0006990 A1 * | 1/2006 | Obradovich | ............. | 340/439 |
| 2007/0276564 A1 * | 11/2007 | Shin et al. | ............. | 701/41 |

FOREIGN PATENT DOCUMENTS

| | | |
|---|---|---|
| JP | 60-113711 | 6/1985 |
| JP | 2-037014 A | 2/1990 |
| JP | 6-115337 A | 4/1994 |
| JP | 7-232531 | 9/1995 |

(Continued)

*Primary Examiner* — Jonathan M Dager
(74) *Attorney, Agent, or Firm* — Arent Fox LLP

(57) ABSTRACT

A control system for an adjustable damping force damper of a suspension apparatus of a vehicle, includes a lateral acceleration detecting unit detecting a lateral acceleration of the vehicle at a gravity point thereof, a yaw rate detecting unit detecting a yaw rate of the vehicle and a control unit controlling a damping force of the damper. The control unit calculates a first target damping force based on an output of the lateral acceleration detecting unit, calculates a second target damping force based on a lateral acceleration at an axel position which is estimated by an output of the yaw rate detecting unit, compares an absolute value of the first target damping force with that of the second target damping force and sets a target controlling value of the damping force in accordance with the first or second target damping force which has a larger absolute value.

1 Claim, 10 Drawing Sheets

FOREIGN PATENT DOCUMENTS

| | | |
|---|---|---|
| JP | 9-86131 | 3/1997 |
| JP | 9-207534 A | 8/1997 |
| JP | 10-95213 | 4/1998 |
| JP | 2765311 | 4/1998 |
| JP | 10-205564 A | 8/1998 |
| JP | 11-105526 | 4/1999 |
| JP | 11-115440 | 4/1999 |

* cited by examiner

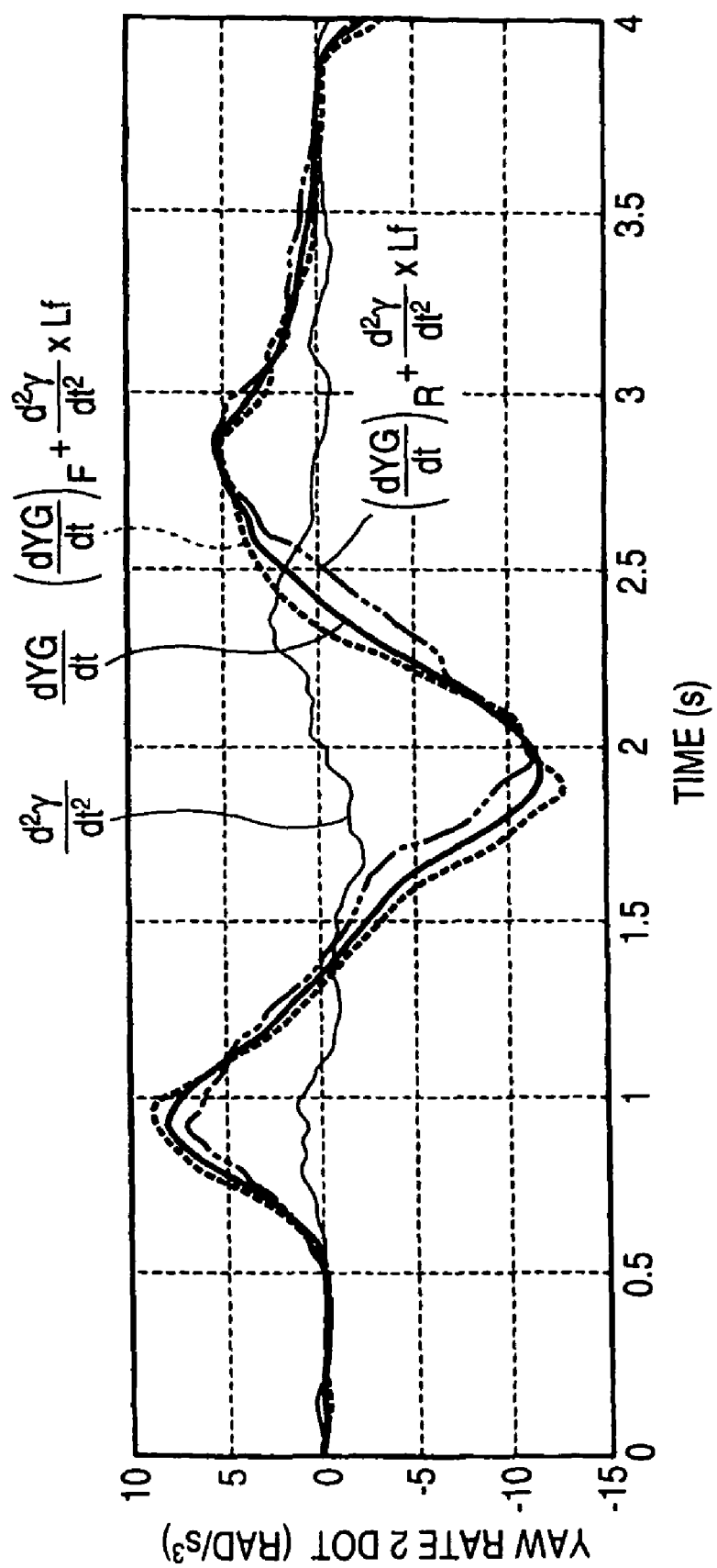

CONTROL SYSTEM FOR ADJUSTABLE DAMPING FORCE DAMPER

The present invention claims foreign priority to Japanese patent applications Nos. P.2005-101580, filed on Mar. 31, 2005 and P.2005-352952, filed on Dec. 7, 2005, the contents of which are incorporated herein by reference.

BACKGROUND OF THE INVENTION

1. Field of the Invention

The present invention relates to a control system for an adjustable damping force damper and, more particularly, a control system for an adjustable damping force damper for controlling a rolling motion of a car body at a time of turning.

2. Description of the Background Art

The spring provided to the suspension apparatus of the vehicle is deformed while absorbing a shock, and springs back in the direction to restore the deformation when an external force disappears. As a result, a reciprocating oscillation is generated. In order to attenuate an oscillation energy of this spring, a damper called the so-called shock absorber is used together in the suspension apparatus of the vehicle. Preferably a damping force of this damper should be set small to lessen a shock, but preferably such damping force of the damper should be set large to some extent to enhance a road-holding performance and a controllability of a tire. As the damper that is able to satisfy these exclusive conditions, an adjustable damping force damper capable of changing a damping force has been known (see Japanese Patent Unexamined Publication No. JP-A-60-113711).

In the meanwhile, the technology to enhance the roll stiffness during a turning operation by controlling a damping force of the damper of each wheel individually in response to a rate of change in lateral acceleration has been known (see Japanese Patent Unexamined Publication No. JP-A-11-115440). Here it is common that the lateral acceleration is sensed at a gravity point of the car body. In order to compensate for a difference in phase caused by the fact that a lateral acceleration sensing point is separated from the axle whose motion must be controlled actually, it is commonly conducted to add a derivative value of the yaw rate to control parameters.

Consequently a responsibility can be improved by leading a phase by using the derivative value of the yaw rate. On the contrary, only when a phase is led simply to improve the control responsibility of the damping force in such a driving situation such as winding road running or slalom running, for example, that the vehicle is running by turning a steering wheel rightward/leftward continuously, a directivity of a controlled target value of the damping force is reversed immediately before a turning angle of the tire passes through a neutral point. For this reason, in case the outer wheel moving on a turning circle is considered, actually the damper must continue to stand still firm, nevertheless the driver feels as if such damper lost its withstanding power. As a result, it is possible that such situation leads the driver to feel a peculiar feeling as if the damper breaks down unexpectedly for an instant.

SUMMARY OF THE INVENTION

The present invention has been made to deal with such afore-described disadvantages, and it is one of objects of the present invention to provide a control system for an adjustable damping force damper, which is improved to get the proper roll stiffness at a time of turning without a deterioration of a high responsibility; and also, to make it possible to set a target damping force of a damper with good precision by sensing exactly a lateral acceleration at a position of a suspension apparatus.

In order to solve such problems, according to a first aspect of the present invention, there is provided a control system for an adjustable damping force damper provided to a suspension apparatus of a vehicle, comprising:

a lateral acceleration detecting unit which detects a lateral acceleration of the vehicle at a gravity point of the vehicle;

a yaw rate detecting unit which detects a yaw rate of the vehicle; and a control unit which controls a damping force of the damper in such a manner that:

calculating a first target damping force based on an output value of the lateral acceleration detecting unit;

calculating a second target damping force based on a lateral acceleration at an axel position which is estimated in accordance with an output value of the yaw rate detecting unit;

comparing an absolute value of the first target damping force with an absolute value of the second target damping force; and setting a target controlling damping force in accordance with the first or second target damping force which has a larger absolute value.

In order to achieve the above object, according to a second aspect of the present invention there is proposed a control system for an adjustable damping force damper, comprising:

a damper provided to a suspension apparatus of a vehicle;

a lateral acceleration sensor provided on a predetermined position of a vehicle body and detecting a lateral acceleration of the vehicle;

a yaw rate sensor detecting a yaw rate; and a control unit which calculates a lateral acceleration at a position of the suspension apparatus in accordance with the lateral acceleration detected by the lateral acceleration sensor and the yaw rate detected by the yaw rate sensor, and determines a damping force of the damper in accordance with the thus calculated lateral acceleration.

According to a third aspect of the present invention, as set forth in the second aspect of the present invention, it is preferable that the damping force of the damper is decided in accordance with a time derivative value of the lateral acceleration at the position of the suspension apparatus.

According to a fourth aspect of the present invention, there is provided a control method for controlling an adjustable damping force of a damper provided to a suspension apparatus of a vehicle, comprising the steps of:

detecting a lateral acceleration of the vehicle at a gravity point of the vehicle;

detecting a yaw rate of the vehicle; and calculating a first target damping force based on the detected lateral acceleration at the gravity point of the vehicle;

estimating a lateral acceleration at an axel position in accordance with the detected yaw rate;

calculating a second target damping force based on the estimated lateral acceleration at the axel position;

comparing an absolute value of the first target damping force with an absolute value of the second target damping force; and setting a target controlling damping force in accordance with the first or second target damping force which has a larger absolute value.

According to a fifth aspect of the present invention, there is provided a control method for controlling an adjustable damping force of a damper provided to a suspension apparatus of a vehicle;

detecting a lateral acceleration of the vehicle at a predetermined position;

detecting a yaw rate;

calculating a lateral acceleration at a position of the suspension apparatus in accordance with the detected lateral acceleration and the detected yaw rate; and determining a damping force of the damper in accordance with the thus calculated lateral acceleration.

According to a sixth aspect of the present invention, as set forth in the fifth aspect of the present invention, it is preferable that the damping force of the damper is decided in accordance with a time derivative value of the lateral acceleration at the position of the suspension apparatus.

According to the present invention, for example, a value having a larger absolute value is selected from the target value A of the damping force control, which is derived by multiplying a derivative value of the lateral acceleration by a predetermined coefficient, and the target value C to which a phase compensation is applied by the yaw rate, and then a value to which a sign of the target value having a higher absolute value out of them is affixed is set as the final target value D in control. As a result, a driver's stepped feeling in the damping force control can be eliminated while maintaining a high responsibility.

According to the above configuration, the lateral acceleration at the position of the suspension apparatus (S) is calculated by taking account of not only the lateral acceleration generated by a turning of the vehicle but also the lateral acceleration generated by a yawing of the vehicle. Therefore, the damping force to be generated in the damper based on this lateral acceleration can be decided exactly, and particularly the driving stability performance in a low speed range can be enhanced.

Further, according to the configuration, a phase of the time derivative value of the lateral acceleration leads a phase of a rolling operation of the vehicle generated by the lateral acceleration. Therefore, the rolling of the vehicle can be suppressed with good responsibility by deciding the lateral acceleration of the damper based on the time derivative value of the lateral acceleration.

BRIEF DESCRIPTION OF THE DRAWINGS

FIG. 11 is a graph showing a derivative value of the lateral acceleration and corrected derivative values of the lateral acceleration on the front side and the rear side.

DETAILED DESCRIPTION OF THE PREFERRED EMBODIMENTS

The present invention will be explained in detail with reference to the accompanying drawings hereinafter.

Figure 1:
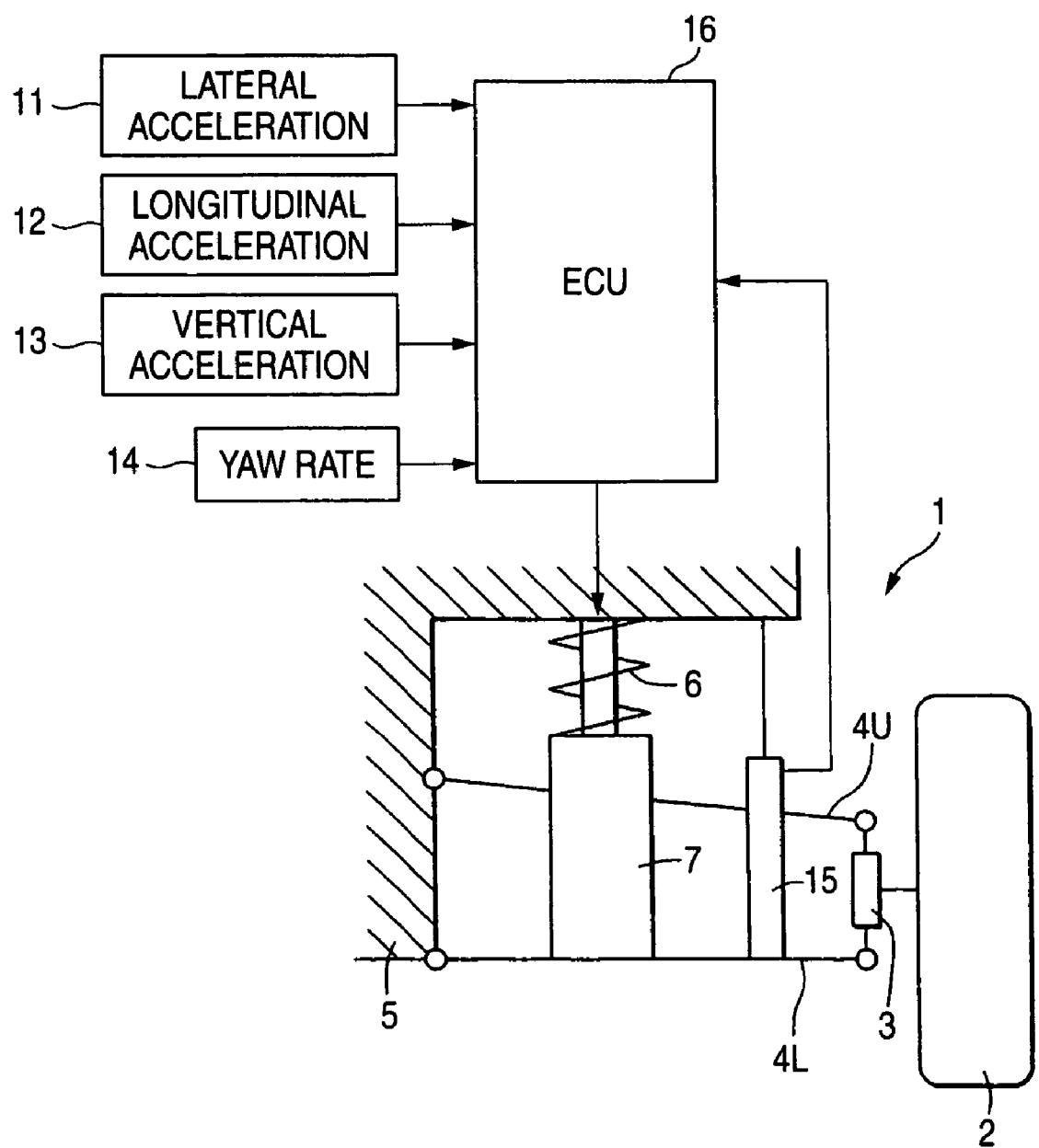
FIG. 1 is a configurative view of one wheel of a suspension apparatus to which the present invention is applied.

FIG. 1 shows an example of a basic configuration of a car suspension apparatus that supports a car body on front/rear and left/right wheels of a four-wheel car. This suspension apparatus 1 includes a knuckle 3 for supporting a tire 2, upper and lower suspension arms 4U, 4L for supporting vertically movably the knuckle 3 onto a car body 5, and a compression coil spring 6 and a hydraulic damper 7 provided in parallel between the lower suspension arm 4L and the car body 5.

As the hydraulic damper 7, an adjustable damping force damper into which MRF (Magneto-Rheological Fluid), for example, is sealed is employed. In this damper 7, when a piston is moved vertically and the damper is contracted/expanded, the MRF flows between a piston upper chamber and a piston lower chamber via orifices provided in the piston, and an apparent viscosity of the MRF is changed by controlling a current applied to MLV (Magnetizable Liquid Valve) provided to the piston. As a result, a damping force of the damper 7 can be changed continuously.

A damping force of the damper 7 is controlled in such a way that a computing unit installed in an electronic control unit (ECU) 16 calculates a control target value based on respective outputs of a lateral acceleration sensor 11, a longitudinal acceleration 12, a vertical acceleration 13, a yaw rate sensor 14, a damper stroke sensor 15, etc. and a vehicle movement at that time can be optimized.

Next, procedures of damping force control by the present invention will be explained hereunder.

Figure 2:
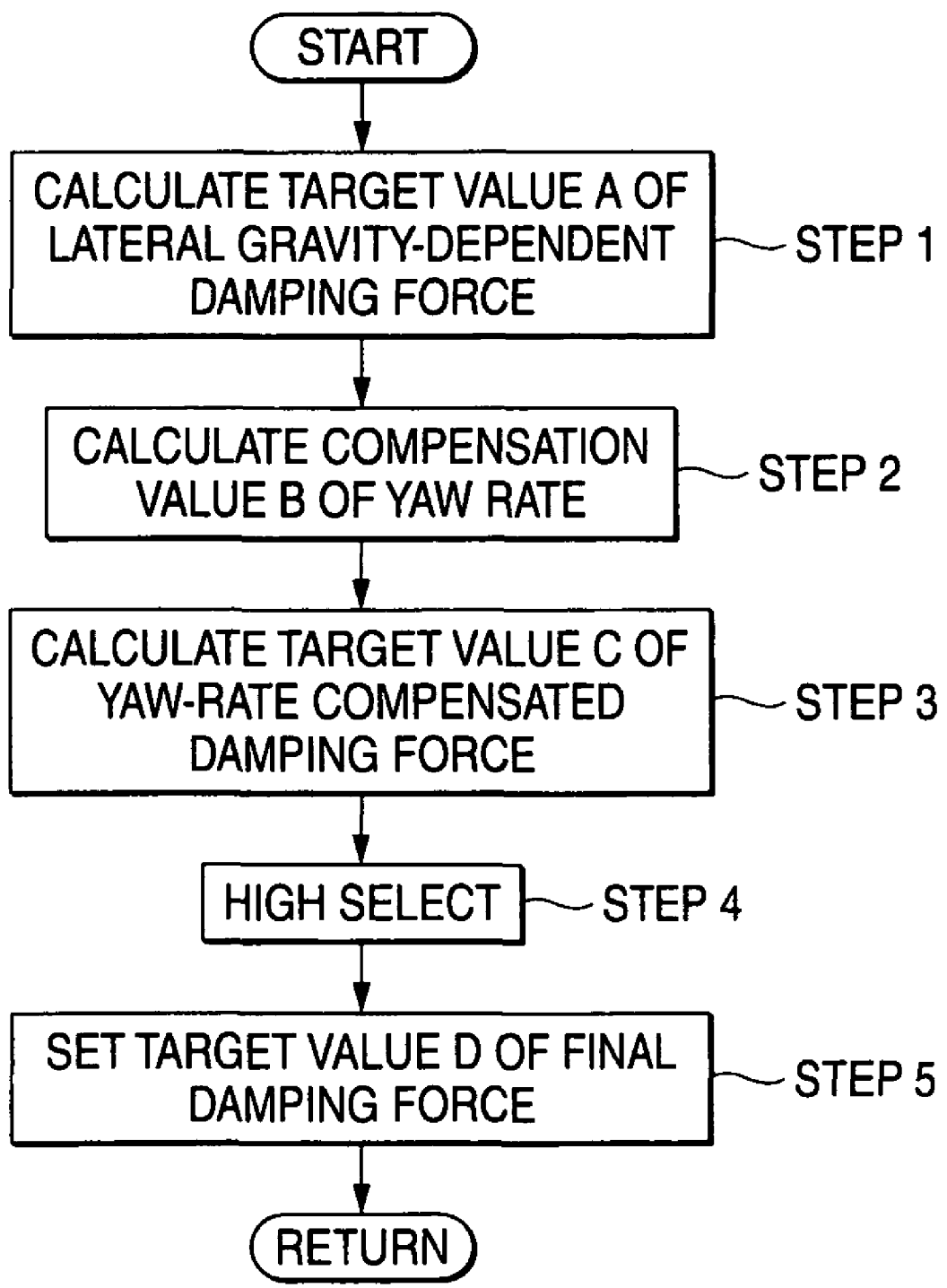
FIG. 2 is a view of a control flow according to the present invention.

FIG. 2 is a view of a control flow according to the present invention. First, an output of the lateral acceleration sensor 11 provided to the gravity point of the car body is once differentiated. Then, a target value A of a gravity-dependent damping force that is proportional to the lateral acceleration is derived by multiplying this value by a predetermined coefficient (step 1).

Then, the output of the yaw rate sensor 14 provided to the gravity point of the car body is twice differentiated. Then, a compensation value B of the yaw rate is derived by multiplying a resultant value by a predetermined coefficient that contains a value equivalent to a distance from the gravity point to a center of the front wheel (step 2).

Then, a target value C of a yaw-rate compensated damping force is obtained by adding the compensation value B of the yaw rate to the target value A of the lateral gravity-dependent damping force (step 3).

Then, the target value A of the gravity-dependent damping force and the target value C of the yaw-rate compensated damping force are compared with each other. Then, the target value having a larger absolute value is selected, and a sign of this value is affixed (step 4).

Then, a damping force of the damper 7 is controlled, while set a value derived in step 4 as a target value D of a final damping force (step 5).

Figure 3:
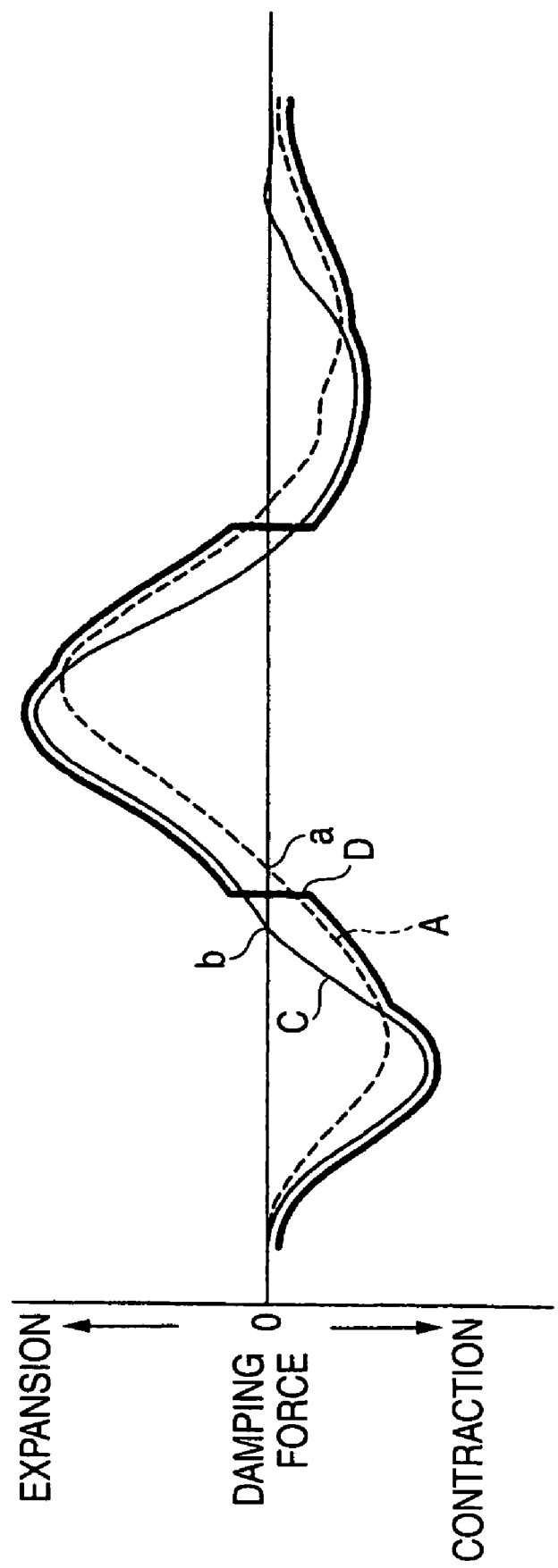
FIG. 3 is a graph showing a transition of a target value of a damping force.

FIG. 3 shows a relationship between above target values A, C, D of respective damping forces during a slalom running at a constant speed. A positive domain is the expansion side, and also a negative domain is the contraction side.

As shown in FIG. 3, the target value A of the gravity-dependent damping force derived based on only the output of the lateral acceleration sensor 11 is changed as indicated by a dotted line whereas the target value C of the yaw-rate compensated damping force into which the compensation value B of the yaw rate is added is changed as indicated by a thin line. As apparent from FIG. 3, the target value C of the yaw-rate compensated damping force leads in phase the target value A of the gravity-dependent damping force, so that a time point b when the target value C of the yaw-rate compensated damping force cuts across a zero point appears earlier than a time point a when the target value A of the gravity-dependent damping force cuts across a zero point. In other words, this brings about such a situation that, when the control of the damping force is executed based on the target value C of the yaw-rate compensated damping force, a responsibility can be improved because of the lead in phase but a direction of a damping force is switched before a steering angle goes back to a neutral point, i.e., the driver is caused to feel a stepped feeling as if the damper breaks down unexpectedly for a moment at an intermediate point of the steering returning.

In compliance with the above process of the present invention, it can be understood that, when the target value D of the final damping force is set by comparing the target value A of the gravity-dependent damping force with the target value C of the yaw-rate compensated damping force and then selecting the target value having a larger absolute value out of them and affixing a sign of the target value having the larger absolute value to this target value, the control target value D of the damping force is shifted as indicated by a solid line, whereby the damping force can be controlled not to cause a loss of load while maintaining a high responsibility.

Next, another embodiment of the present invention will be explained based on accompanying FIG. 4 to FIG. 9.

Figure 4:
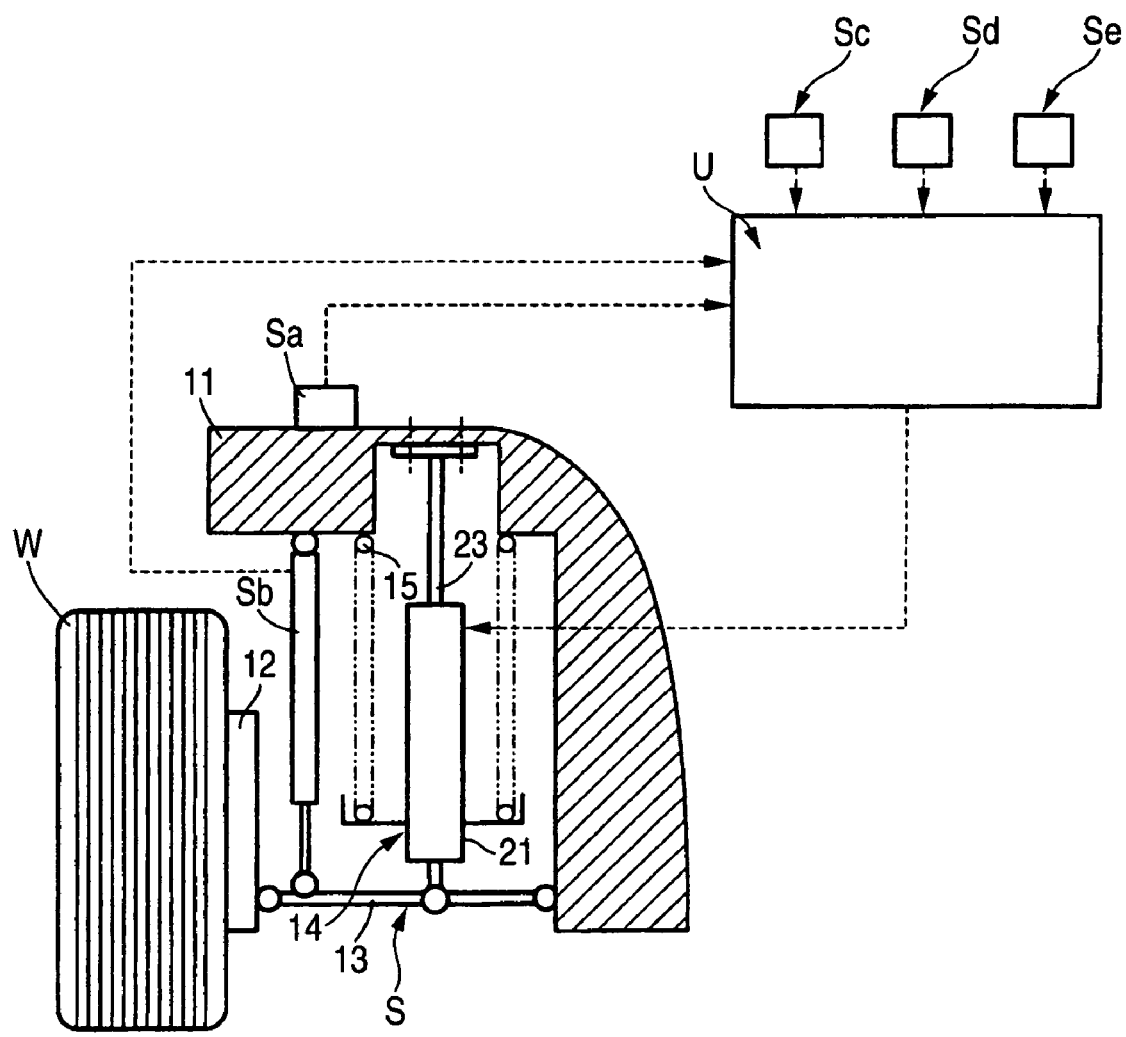
FIG. 4 is a front view of a suspension apparatus of a vehicle.
Figure 5:
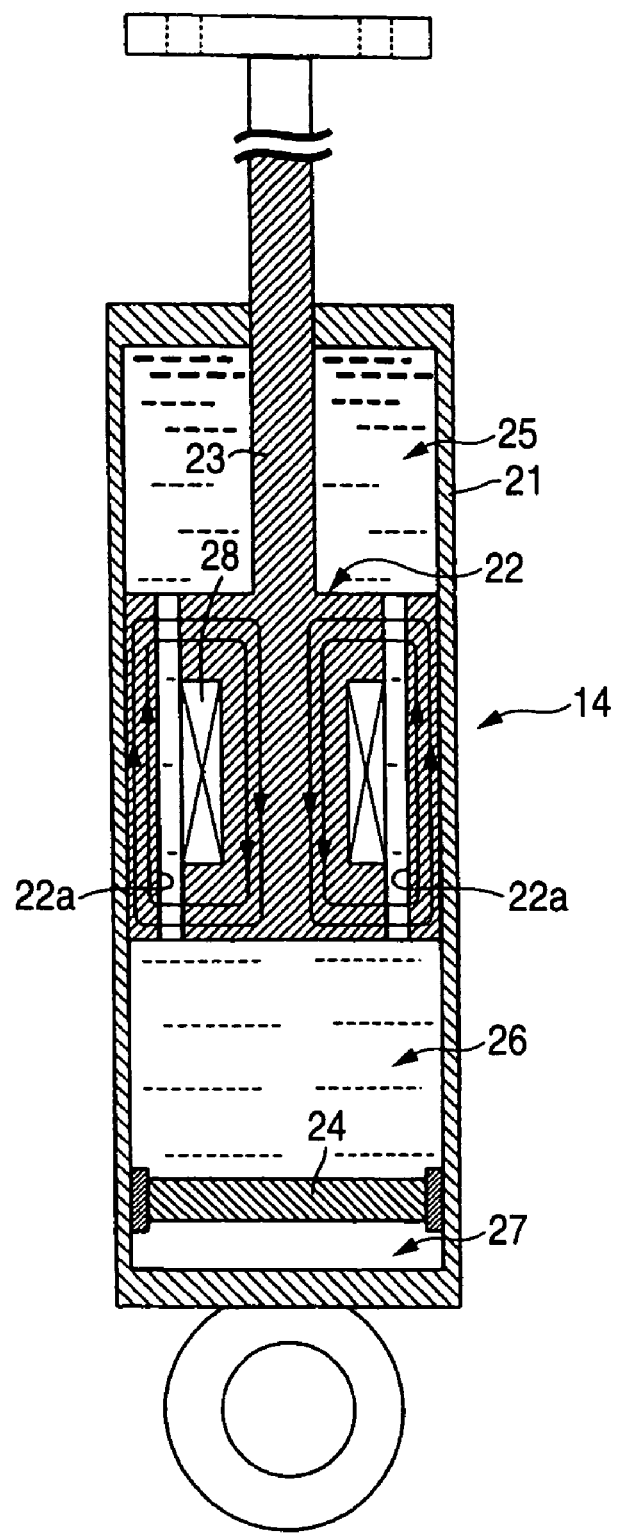
FIG. 5 is an enlarged sectional view of an adjustable damping force damper.
Figure 6:
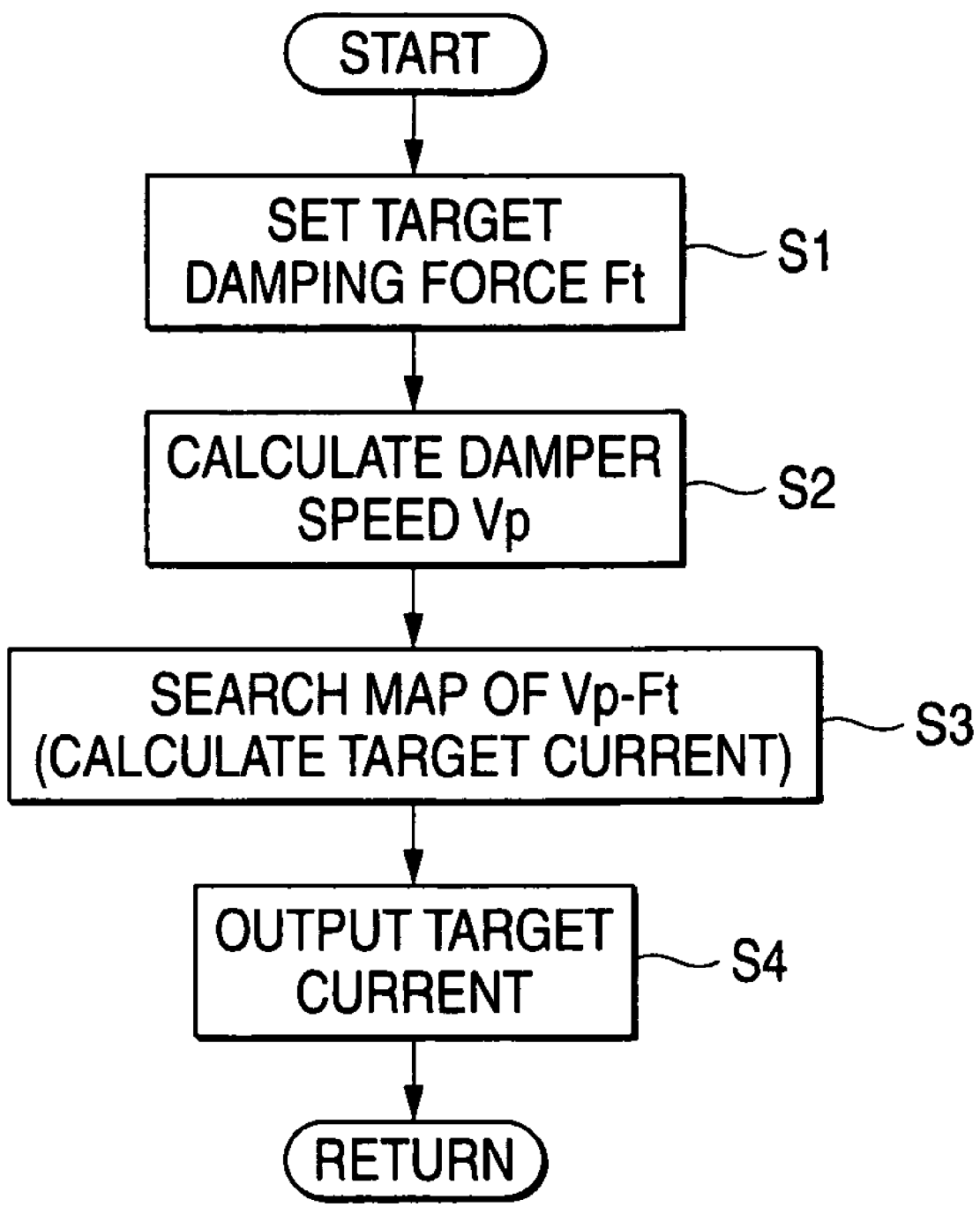
FIG. 6 is a flowchart of damping force control of the damper.
Figure 7:
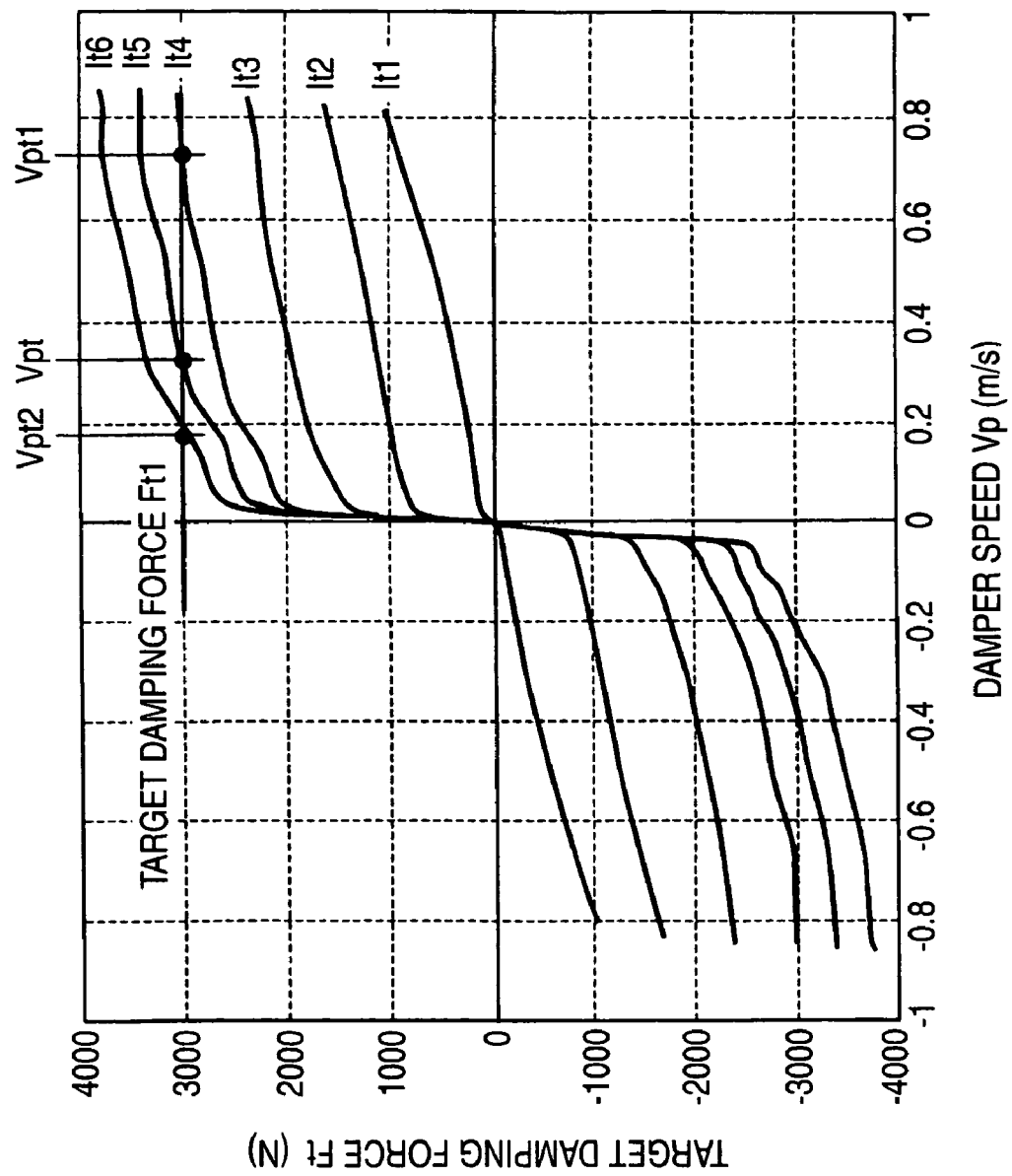
FIG. 7 is a map used to search a target current from a damper speed and a target damping force.
Figure 8:
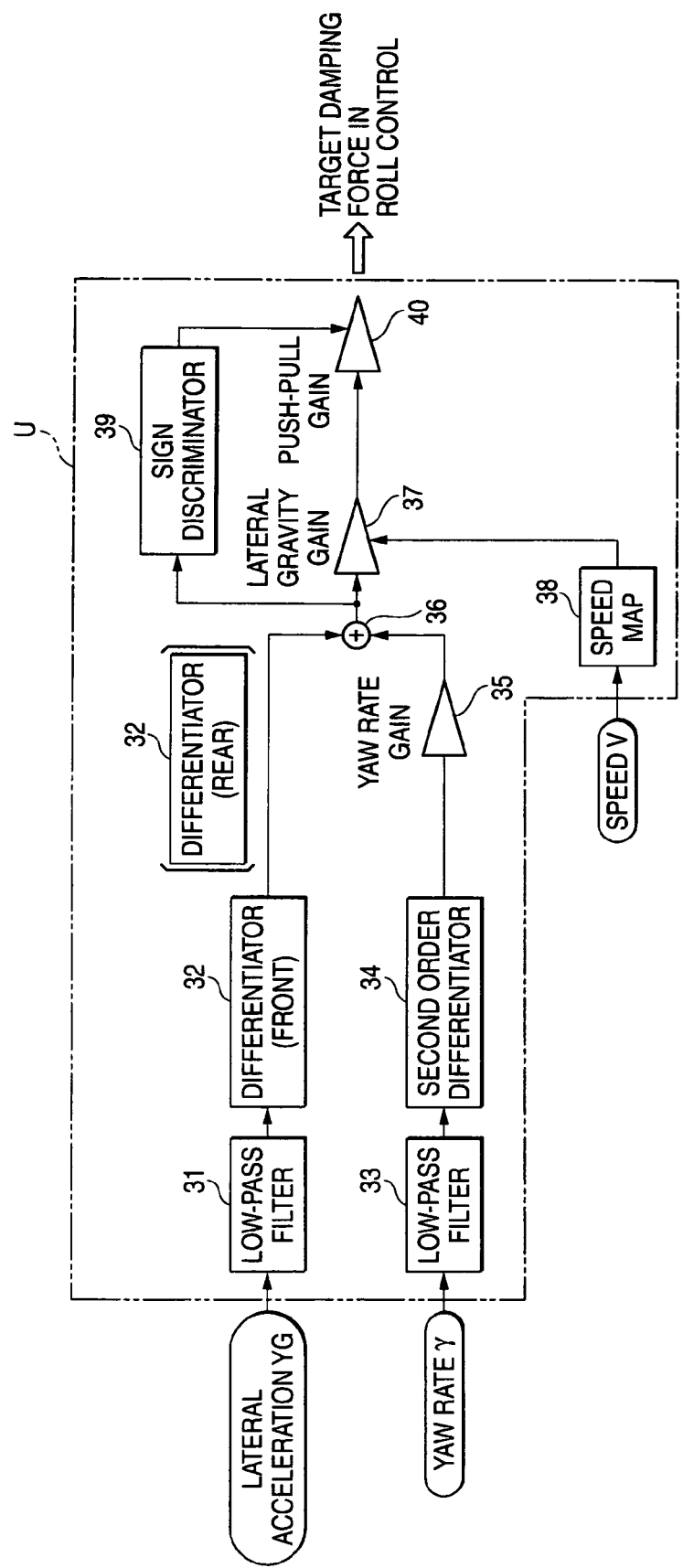
FIG. 8 is a block diagram of a computing circuit of the target damping force of the damper.
Figure 9:
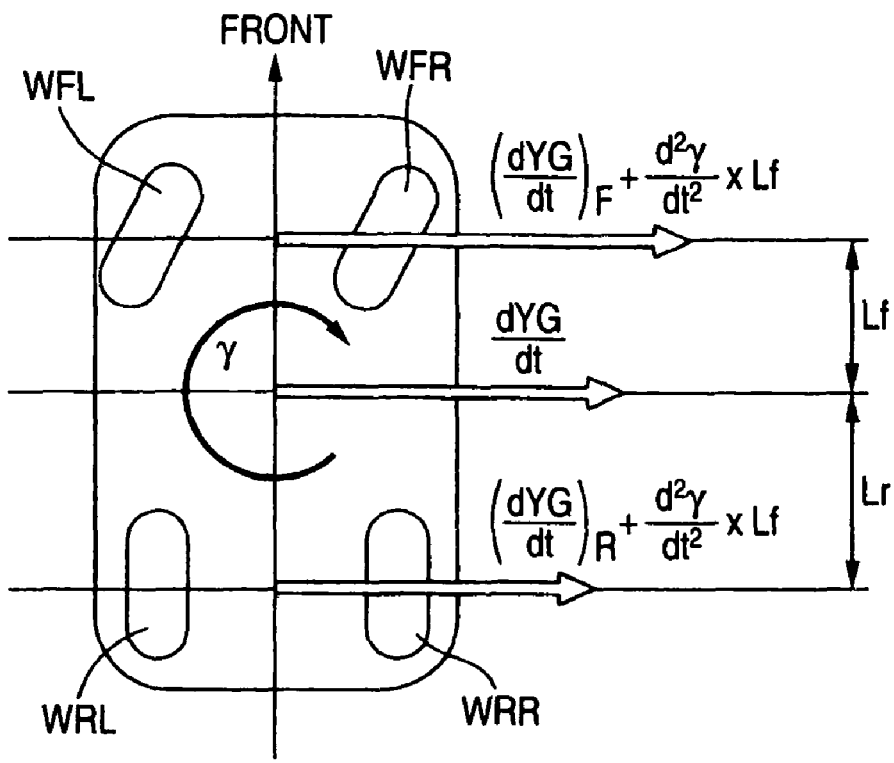
FIG. 9 is an explanatory view of the principle applied to calculate a corrected derivative value of the lateral acceleration from a lateral acceleration and a yaw rate.
Figure 10:
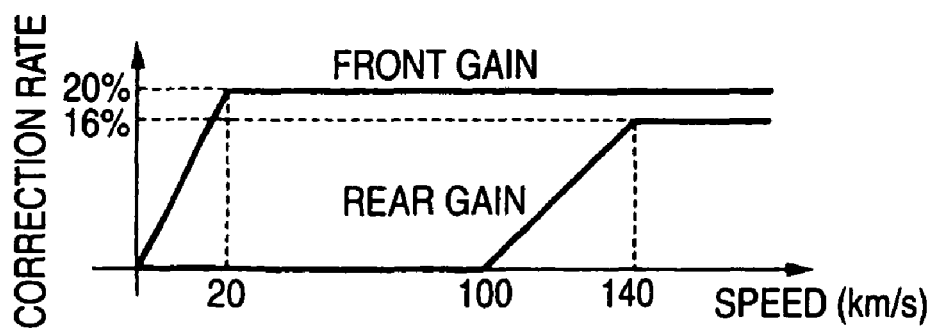
FIG. 10 is a map used to search a lateral acceleration gain from a speed.

FIG. 4 to FIG. 9 show an embodiment of the present invention. FIG. 4 is a front view of a suspension apparatus of a vehicle, FIG. 5 is an enlarged sectional view of an adjustable damping force damper, FIG. 6 is a flowchart of damping force control of the damper, FIG. 7 is a map used to search a target current from a damper speed and a target damping force, FIG. 8 is a block diagram of a computing circuit of the target damping force of the damper, FIG. 9 is an explanatory view of the principle applied to calculate a corrected derivative value of the lateral acceleration from a lateral acceleration and a yaw rate, FIG. 10 is a map used to search a lateral acceleration gain from a speed, and FIG. 11 is a graph showing a derivative value of the lateral acceleration and corrected derivative values of the lateral acceleration on the front side and the rear side.

As shown in FIG. 4, a suspension apparatus S that suspend a wheel W of a four-wheel vehicle includes a suspension arm 113 for supporting vertically movably a knuckle 112 onto a vehicle body 111, an adjustable damping force damper 114 for connecting the suspension arm 113 and the vehicle body 111, and a coil spring 115 for connecting the suspension arm 113 and the vehicle body 111. A signal from a sprung acceleration sensor Sa that senses a sprung acceleration, a signal from a damper displacement sensor Sb that senses a displacement (stroke) of the damper 114, a signal from a lateral acceleration sensor Sc that senses a lateral acceleration of the vehicle, and a signal from a yaw rate sensor Sd that senses a yaw rate of the vehicle are input into an electronic control unit U that controls an adjustable damping force of the damper 114.

In this case, it is supposed that a center of a yawing of the vehicle corresponds to a gravity center position of the vehicle. A distance from the gravity center position of the vehicle to the suspension apparatus S, S of the front wheels is Lf, and a distance from the gravity center position of the vehicle to the suspension apparatus S, S of the rear wheels is Lr (see FIG. 9).

As shown in FIG. 5, the damper 114 has a cylinder 121 whose lower end is connected to the suspension arm 113, a piston 122 fitted slidably into the cylinder 121, a piston rod 123 extended upward from the piston 122 to pass through an upper wall of the cylinder 121 and connect its upper end to the vehicle body, and a free piston 124 fitted slidably into a bottom portion of the cylinder. An upper-side first fluid chamber 125 and a lower-side second fluid chamber 126 are partitioned by the piston 122 in the cylinder 121, and also a gas chamber 127 into which a compressed gas is sealed is partitioned under the free piston 124.

A plurality of fluid passages 122a . . . are formed in the piston 122 to cause an upper surface and a lower surface to communicate with each other, and the first and second fluid chambers 125, 126 are communicated mutually via these the fluid passages 122a . . . . The magneto-rheological fluids sealed in the first and second fluid chambers 125, 126 and the fluid passages 122a . . . is formed by dispersing fine grains of the magnetic material such as iron powders into the viscous fluid such as the oil. The magneto-rheological fluids has such a property that, when a magnetic field is applied, the fine grains of the magnetic material are aligned along lines of magnetic force and thus the viscous fluid is hard to flow to yield an increase in an apparent viscosity. A coil 128 is provided to an inside of the piston, and a current supply to the coil 128 is controlled by the electronic control unit U. When a current is supplied to the coil 128, magnetic fluxes are generated as indicated with an arrow and then the viscosity of the magneto-rheological fluids is changed by the magnetic fluxes passing through the fluid passages 122a . . . .

When the damper 114 is contracted and then the piston 122 moves downward in the cylinder 121, a volume of the first fluid chamber 125 is increased but a volume of the second fluid chamber 126 is decreased. Therefore, the magneto-rheological fluids in the second fluid chamber 126 flows into the first fluid chamber 125 to pass through the fluid passages 122a . . . in the piston 122. On the contrary, when the damper 114 is expanded and then the piston 122 moves upward in the cylinder 121, a volume of the second fluid chamber 126 is increased but a volume of the first fluid chamber 125 is decreased. Therefore, the magneto-rheological fluids in the first fluid chamber 125 flows into the second fluid chamber 126 to pass through the fluid passages 122a . . . in the piston 122. At that time, the damper 114 generates a damping force by a viscous resistance of the magneto-rheological fluids passing through the fluid passages 122a . . . .

At this time, when a magnetic field is generated by supplying a current to the coil 128, an apparent viscosity of the magneto-rheological fluids that pass through the fluid passages 122a . . . in the piston 122 is increased, and thus the fluids are hard to pass through the fluid passages 122a . . . . Therefore, a damping force of the damper 114 is increased. An amount of increase in this damping force can be controlled freely by amplitude of a current that is supplied to the coil 128.

In this case, when a volume of the second fluid chamber 126 is decreased because an impulsive compressive load is applied to the damper 114, the free piston 124 is moved downward while causing the gas chamber 127 to contract, so that an impact can be absorbed. Conversely, when a volume of the second fluid chamber 126 is increased because an impulsive tensile load is applied to the damper 114, the free piston 124 is moved upward while causing the gas chamber 127 to expand, so that an impact can be absorbed. In addition, when a volume of the piston rod 123 fitted in the cylinder 121 is increased because the piston 122 is moved downward, the free piston 124 is moved downward to absorb an amount of increase in the volume.

Then, the electronic control unit U controls individually a damping force of four dampers 114 . . . of respective wheels W . . . in total based on a sprung acceleration sensed by the sprung acceleration sensor Sa, a damper displacement sensed by the damper displacement sensor Sb, a lateral acceleration sensed by the lateral acceleration sensor Sc, a yaw rate sensed by the yaw rate sensor Sd, and a speed sensed by the speed sensor Se. Accordingly, the electronic control unit U executes selectively the ride control such as the skyhook control, which enhances a riding feeling by suppressing the motion of the vehicle when such vehicle gets over unevenness on a road surface, or the like and the driving stability control, which suppresses a rolling caused at a time of the vehicle turning and a pitching caused at a time of rapid acceleration or rapid deceleration, in response to the driving condition of the vehicle.

A flowchart explaining an action of driving stability control that suppresses a rolling by enhancing a damping force of the dampers 114 . . . at a time of turning of the vehicle is shown in FIG. 6.

First, in step S101, the target damping force Ft to be generated in the damper 114 is calculated based on the lateral acceleration YG sensed by the lateral acceleration sensor Sc, the yaw rate Y sensed by the yaw rate sensor Sd, and the speed sensed by the speed sensor Se. Details of the calculation of the target damping force Ft will be explained later. Then, in step S10102, a damper speed Vp is calculated by differentiating a damper displacement sensed by the damper displacement sensor Sb with respect to time. Then, in step S013, a target current It is searched by applying the target damping force Ft and the damper speed Vp to a map in FIG. 7. Then, in step S104, the target damping force Ft is generated by supplying the target current It to the coil of the damper 114, whereby the driving stability performance can be improved by suppressing the rolling of the vehicle.

FIG. 7 shows a map used to search the target current It from the target damping force Ft and the damper speed Vp. When the damper speed Vp is constant, the target current It is increased as the target damping force Ft is increased. In contrast, when the target damping force Ft is constant, the target current It is decreased as the damper speed Vp is increased. For example, in the case where the target damping force Ft is Ft1, the target current is It5 when the damper speed Vp is Vpt, then the target current is decreased to It4 when the damper speed Vp is increased to Vpt1, and then the target current is increased to It6 when the damper speed Vp is decreased to Vpt2.

Next, the process of calculating the target damping force Ft of the damper 114 from the lateral acceleration YG, the yaw rate γ, and the speed V in above step S101 will be explained hereunder.

As shown in FIG. 8, the electronic control unit U includes a low-pass filter 131, a differentiator 132, a low-pass filter 133, a second order differentiator 134, a yaw rate gain 135, an adder 136, a lateral acceleration gain 137, a speed map 138, a sign discriminator 139, and a push-pull gain 140.

The lateral acceleration YG sensed by the lateral acceleration sensor Sc is passed through the low-pass filter 131, and at that time the lateral acceleration that does not depend on the steering during the normal running is cut off. The lateral acceleration YG that is passed through the low-pass filter 131 is differentiated by the differentiator 132 with respect to time, and thus a derivative value dYG/dt of the lateral acceleration is calculated. In this case, as shown in FIG. 9, the differentiator 132 for the lateral acceleration YG is provided to front wheels WFL, WFR and rear wheels WRL, WRR respectively. Also, $(dYG/dt)_F$ for the front wheels WFL, WFR and $(dYG/dt)_R$ for the rear wheels WRL, WRR are calculated as the derivative value of the lateral acceleration respectively.

In contrast, the yaw rate γ sensed by the yaw rate sensor Sd is passed through the low-pass filter 133, and at that time the yaw rate that does not depend on the steering during the normal running is cut off. The yaw rate γ after passed through the low-pass filter 133 undergoes the second differential with respect to time by the second order differentiator 134, and thus the yaw rate second derivative value $d^2\gamma/dt^2$ is calculated. Then, the yaw rate second derivative value $d^2\gamma/dt^2$ is multiplied by either a distance Lf from the gravity center position of the vehicle to the suspension apparatus S, S for the front wheels WFL, WFR or a distance Lr from the gravity center position of the vehicle to the suspension apparatus S, S for the rear wheels WRL, WRR by the yaw rate gain 135. Thus, a correction value $d^2\gamma/dt^2 \times Lf$ of the lateral acceleration derivative value in positions of the front wheels WFL, WFR caused by the yawing of the vehicle and a correction value $d^2\gamma/dt^2 \times Lr$ of the lateral acceleration derivative value in positions of the rear wheels WRL, WRR caused by the yawing of the vehicle are calculated.

Then, a derivative value $(dYG/dt)_F$ of the lateral acceleration on the front side and the correction value $d^2\gamma/dt^2 \times Lf$ of the derivative value of the lateral acceleration on the front side are added by the adder 136. Thus, a corrected derivative value of the lateral acceleration on the front side is calculated as $$(dYG/dt)_F + d^2\gamma/dt^2 \times Lf.$$

Also, a derivative value $(dYG/dt)_R$ of the lateral acceleration on the rear side and the correction value $d^2\gamma/dt^2 \times Lr$ of the derivative value of the lateral acceleration on the rear side are added by the adder 136. Thus, a corrected derivative value of the lateral acceleration on the rear side is calculated as $$(dYG/dt)_R + d^2\gamma/dt^2 \times Lr.$$

FIG. 10 shows the speed map 138 used to search the lateral acceleration gain by using the speed V sensed by the speed sensor Se as a parameter. The corrected derivative value of the lateral acceleration on the front side and the corrected derivative value of the lateral acceleration on the rear side are multiplied by the gains on the front side and the rear side, which are searched from the speed map 138, respectively. Then, while deciding a sign of the output of the adder 136 by the sign discriminator 139, the lateral acceleration acting on the vehicle is multiplied by the push-pull gain 140 that is set differently to the damper 114 on the contraction side and the damper 114 on the expansion side, and then output as the target damping force Ft on the front side and the rear side.

In FIG. 11, the derivative value dYG/dt of the lateral acceleration in the gravity center position of the vehicle is indicated by a solid line, the corrected derivative value $(dYG/dt)_F + d^2\gamma/dt^2 \times Lf$ of the lateral acceleration in positions of the front wheels WFL, WFR is indicated by a broken line, and the corrected derivative value $(dYG/dt)_R + d^2\gamma/dt^2 \times Lr$ of the lateral acceleration in positions of the rear wheels WRL, WRR is indicated by a chain line.

As described above, the target damping force of the damper 114 is set by using the lateral acceleration that is corrected by adding the lateral acceleration generated by a yawing of the vehicle to the lateral acceleration generated by a turning of the vehicle. Therefore, the target damping force of the damper 114 can be set to reflect exactly the lateral acceleration at the positions of the front wheels WFL, WFR or the positions of the rear wheels WRL, WRR, and the driving stability performance of the vehicle can be enhanced by accelerating particularly a rise of the target damping force in a low speed range. In addition, the target damping force is set not by using the lateral acceleration of the vehicle as it is but by using the time derivative value of the lateral acceleration, a phase of which leads a phase of the lateral acceleration Therefore, particularly control responsibility of the damping force of the damper 114 in the initial phase of steering can be further enhanced.

Here, the ride control applied when the above driving stability control is not executed is the well-known skyhook control. The dampers 114 . . . are controlled to increase the damping force when the sprung speed (the upward direction is positive) and the damper speed (the expanding direction is positive) are in the same direction. In contrast, the dampers 114 . . . are controlled to decrease the damping force when the sprung speed and the damper speed are in the opposite direction. The sprung speed can be obtained by integrating the sprung acceleration sensed by the sprung acceleration sensor Sa, and the damper speed can be obtained by differentiating the damper displacement sensed by the damper displacement sensor Sb.

With the above, the embodiment of the present invention is explained. But various changes of design can be applied to the present invention within a scope that does not depart from a gist of the invention.

For example, in the embodiment, the target damping force is set based on the time derivative value of the lateral acceleration of the vehicle. But the target damping force may be set based on the lateral acceleration of the vehicle.

Also, in the embodiment, a damping force of the damper 114 . . . is variably controlled by using the magneto-rheological fluids. But an approach of variably controlling a damping force can be chosen freely.

In applying the present invention, a configuration of means for varying a damping force is not particularly restricted. For example, means for switching an area of a mechanical orifice by using a rotary valve, or the like may be embodied. Also, a technical idea of the present invention is not restricted to a passively controlled suspension apparatus, and can be applied to an actively controlled suspension apparatus in which functions of the coil spring and the damper is replaced with a hydraulic actuator.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A control system for an adjustable damping force damper provided to a suspension apparatus of a vehicle, comprising:
 a lateral acceleration sensor which detects a lateral acceleration of the vehicle and is provided at a predetermined position of the vehicle;
 a yaw rate sensor which detects a yaw rate of the vehicle; and
 a control unit which calculates a lateral acceleration at a position offset from the predetermined position of the lateral acceleration sensor in a front and back direction of the vehicle based on the lateral acceleration detected by the lateral acceleration sensor and the yaw rate detected by the yaw rate sensor, and wherein the control unit further calculates the target damping force based on the lateral acceleration calculated by the control unit
 wherein the control unit calculates a lateral acceleration at a position of the suspension apparatus in accordance with the lateral acceleration detected by the lateral acceleration sensor and the yaw rate detected by the yaw rate sensor, and wherein the control unit sets a damping force of the damper in accordance with the lateral acceleration calculated by the control unit
 wherein the control unit is configured to:
 calculate a first target damping force based on an output value of the lateral acceleration sensor;
 calculate a second target damping force based on a lateral acceleration at an axle position, which is estimated in accordance with an output value of the yaw rate sensor;
 compare an absolute value of the first target damping force with an absolute value of the second target damping force; and
 set a target controlling damping force according to a higher one of the absolute value of the first target damping force and the absolute value of the second target damping force.

* * * * *